United States Patent Office 3,234,272
Patented Feb. 8, 1966

3,234,272
POLYHALOALKYLTHIOSULFENYL HALIDES AND PROCESS OF PREPARATION
Joseph E. Moore, Richmond, and Gustave K. Kohn, Berkeley, Calif., assignors to Chevron Research Company, San Francisco, Calif., a corporation of Delaware
No Drawing. Filed June 7, 1963, Ser. No. 286,193
12 Claims. (Cl. 260—543)

This application is a continuation-in-part of our co-pending applications Serial Nos. 47,133 and 47,134, filed August 3, 1960, now abandoned.

This invention relates to a novel class of polyhaloalkylthiosulfenyl halides and a method for their preparation. In particular, this invention relates to polyhaloalkylthiosulfenyl chlorides and bromides of from 1 to 2 carbons, their method of preparation and their use.

The compounds of this invention are polyhaloalkylthiosulfenyl halides of from 1 to 2 carbons and having at least 4 halogens. The novel polyhaloalkylthiosulfenyl halides have the formula:

$$X_{2n}YC_nSSY$$

where X is hydrogen or halogen (fluorine, chlorine, bromine or iodine), at least 2 X's being halogen, Y is halogen of atomic number 17 to 35 (chlorine or bromine) and when bonded to carbon is alpha to the sulfur, n is a cardinal number of from 1 to 2.

The methyl compound has the formula:

$$YX_2CSSY$$

while the ethyl compound has the formula:

$$X_3C\overset{\overset{\displaystyle X}{|}}{\underset{\underset{\displaystyle Y}{|}}{C}}SSY$$

wherein X and Y are as defined previously. The preferred ethyl compounds have not more than 1 X as hydrogen, and it is particularly preferred when all the X's are halogen.

Preferably, X is a halogen of atomic number 17 to 35. Particularly preferred is when at least 2 X's and Y are chlorine. The particularly preferred compounds are trichloromethylthiosulfenyl chloride, 1,1,2,2-tetrachloroethylthiosulfenyl chloride and pentachloroethylthiosulfenyl chloride.

The compounds within the scope of this invention include bromodichloromethylthiosulfenyl chloride, 1,2,2-trichloro-1,2-dibromoethylthiosulfenyl bromide, 2-bromo-1,1,2,2-tetrachloroethylthiosulfenyl chloride, 2,2-difluoro-1,1,2-trichloroethylthiosulfenyl chloride, 1,1,2,2-tetrafluoro-2-chloroethylthiosulfenyl chloride, etc.

To prepare the compounds of this invention, as well as numerous other compounds which are polyhaloalkylthiosulfenyl halides, particularly thiosulfenyl chlorides and bromides, the following method of preparation can be used. The polyhaloalkylsulfenyl halide is treated with sulfur in the presence of a neutral phosphate ester. The temperature at which the reaction may be conveniently carried out is the reflux temperature of the polyhaloalkylthiosulfenyl halide, if that temperature is not above the temperature at which the product tends to decompose. If desired, a solvent boiling below the reflux temperature of the sulfenyl halide reactant may be employed to reduce the reflux temperature. Suitable solvents are those unreactive with the sulfenyl halide employed, such as hydrocarbon, e.g., benzene, halohydrocarbon, e.g., carbon tetrachloride, tetrachloroethane, substituted aromatics, e.g., nitrobenzene, benzonitrile, etc. Temperatures will usually be in the range of about 50 to 200° C., and preferably in the range of about 130 to 160° C.

About 0.5–5.0 moles of sulfur, preferably 1 to 2 moles of sulfur, are added per mole of sulfenyl halide.

As indicated, the thiosulfenyl halides which can be prepared in this method are polyhaloalkylthiosulfenyl halides. The compounds are lower alkyl compounds having at least 3 halogens, one of which is alpha to the sulfur. The compounds, therefore, are from 1 to 6 carbons, and preferably from 1 to 3 carbons. There must be at least 3 halogens bonded to carbon, preferably not more than 9 halogens, and particularly preferred, not more than 7. The preferred halogens are chlorine and bromine, i.e., of atomic number 17 to 35, and particularly preferred is chlorine. Compounds which can be prepared include 1,1,2-trichloropropylthiosulfenyl chloride, 1,2,3,4-tetrachlorobutylthiosulfenyl chloride, 1,2-dibromo-3-chloropropylthiosulfenyl chloride, etc.

The phosphate ester is a tri-substituted ester. Preferably, the phosphate ester is a trihydrocarbyl phosphate ester, when the hydrocarbyl group is of from 1 to 10 carbons. The hydrocarbyl group may be aliphatic, alicyclic, aromatic, aralkyl, alkaryl, etc. Illustrative of trialkyl phosphates are triethyl phosphate, tributyl phosphate, diethyl butyl phosphate, trihexyl phosphate, etc., the preferred alkyl phosphate being triethyl phosphate. Usually, the trialkyl phosphate will have alkyl groups of from 1 to 6 carbons. The aryl phosphates are illustrated by triphenyl phosphate, tritolyl phosphate, etc. Other phosphates include tribenzyl phosphate, tricyclohexyl phosphate, etc.

The amount of phosphate will generally range from about 0.01 to 10% by weight of the reaction mixture, preferably from about 1 to 3%.

The phosphate ester may be mixed with one of the reactants before reaction, or it may be added directly to the reaction mixture. The reaction is generally slow, and is therefore usually allowed to continue for long periods of time to obtain optimum yields. However, the time required will vary depending upon the particular sulfenyl halide reactant.

The yield of the product may be enhanced by allowing the reaction to proceed for a reasonable period of time, e.g., for about 10 minutes to one hour, then cooling to a temperature in the range —10° to +25° C., preferably 0°–10° C., and then slowly bubbling chlorine gas into the reaction mixture while maintaining the temperature relatively constant. Approximately 0.25 to 2.0 moles chlorine should be used per mole of sulfenyl halide, preferably 0.5 to 1 mole. The time for the introduction of the chlorine will vary widely, but should usually be not less than about 10 minutes, and no advantage is found in extending the period for much over one hour.

After reaction, any unreacted sulfur may be removed by filtration. Any by-products formed, such as sulfur chloride, are removed by distillation, if necessary under vacuum, and the final product is separated by fractionation. The compounds which may be prepared are generally liquids at low atmospheric pressure and temperature.

The polyhaloethylsulfenyl halide may be prepared in a variety of ways. One common way is to add sulfur monochloride to an olefin and then cleave the resulting disulfide with chlorine. Chlorine can be introduced in the alpha position of the sulfenyl halide by chlorination at a temperature at above about −20° C. and below the decomposition temperature of reaction products in the presence of a catalytic amount of chlorosulfonic acid or sulfuric acid. See copending applications Serial Nos. 55,108–9, filed September 12, 1960, now Patents Nos. 3,144,482–3, respectively.

The thiosulfenyl bromide may be prepared from the thiosulfenyl chloride by exchange with hydrobromic acid.

The following examples are offered by way of illustration and not by way of limitation.

*Example I.—Preparation of perchloromethylsulfenyl chloride*

1700 g. of perchloromethyl mercaptan, 400 g. sulfur, and 50 g. triethylphosphate were heated with agitation to 140°–150° C. and maintained at that temperature for 7 hours. The mixture was cooled, the unreacted sulfur removed by filtration, and the low boiling reaction by-products were stripped at a pressure of about 25 mm. Hg. The remaining solution was then fractionated under a vacuum and the desired product, analyzed to be perchloromethylthiosulfenyl chloride, collected at 55°–65° C. at 2.5–3.8 mm. Hg.

|  | Found | Theoretical |
|---|---|---|
| Percent Cl | 61.3 | 65.1 |
| Percent S | 27.5 | 29.4 |

A perhalomethylthiosulfenyl chloride, such as bromodichloromethylthiosulfenyl chloride, may also be prepared according to the process of the invention. This was found to boil in the range of 52°–60° C. at 0.5 mm. pressure and analyzed as follows:

|  | Found | Theoretical |
|---|---|---|
| Percent S | 23.8 | 24.4 |
| Percent Br | 27.0 | 30.5 |
| Percent Cl | 41.1 | 40.6 |

*Example II.—Preparation of 1,1,2,2-tetrachloroethylthiosulfenyl chloride*

168 g. of 1,1,2,2-tetrachloroethylsulfenyl chloride, 23 g. sulfur, and 5 g. triethylphosphate were heated with agitation to 160°–170° C. and maintained at that temperature for 1 hour. The mixture was cooled to 5° C. and 26 g. chlorine were bubbled in over a period of about 20 minutes at 0°–5° C. The mixture was agitated for one-half hour and allowed to stand overnight. The low boiling reaction by-products were stripped at a pressure of about 25 mm. Hg and a temperature of 50° C. The remaining solution was then fractionated under a vacuum and the desired product, analyzed to be 1,1,2,2-tetrachloroethylthiosulfenyl chloride, collected at 63.7°–65.9° C. at 0.03–0.04 mm. Hg.

|  | Found | Theoretical |
|---|---|---|
| Percent Cl | 66.5 | 66.7 |
| Percent S | 24.0 | 24.0 |

A 1,1,2,2-tetrahaloethylthiosulfenyl chloride having bromines as some or all of the halogens may also be prepared according to the process of the invention.

*Example III.—Preparation of perchloroethylthiosulfenyl chloride*

A mixture of 199 g. bis-α,β,β,β-tetrachloroethyl disulfide, 200 ml. carbon tetrachloride solvent, and 2 g. 98 percent by weight sulfuric acid was cooled to about 0°–5° C. and maintained there by means of a water-ice bath while 106.5 g. chlorine were bubbled slowly into the mixture so as to avoid unduly rapid formation of hydrogen chloride gas. After the addition of chlorine was completed, the reaction was quenched with ice water and any sulfuric acid remaining was removed by water-extraction. Solvent was removed by distillation at 40° C. and 20 mm. Hg, and the remaining product was chilled whereupon a yellow solid crystallized which was analyzed to be perchloroethylsulfenyl chloride.

A mixture of 500 g. of the above sulfenyl chloride, 89.4 g. sulfur, and 5.0 g. triethylphosphate was stirred at 145°–155° C. for 9 hours. Any by-products obtained in the process were first removed by a vacuum distillation at 20 mm. Hg keeping the temperature in the vessel at about 90° C. After a sufficient portion of these by-products were removed, the pressure was reduced to 0.25 mm. Hg and a fraction boiling at 80° C. was removed. This fraction had a density at 23° C. of 1,804 gm./ml. and an $n_D^{26}$ of 1.6063. Analysis showed the product to be perchloroethylthiosulfenyl chloride.

|  | Found | Theoretical |
|---|---|---|
| Percent S | 21.8 | 21.4 |
| Percent Cl | 69.7 | 70.9 |

*Example IV.—Preparation of perchloroethylthiosulfenyl bromide*

5 g. of the above perchloroethylthiosulfenyl chloride were agitated at room temperature with 10 ml. 48 percent by weight hydrobromic acid for 5 minutes. A product having a specific gravity of 2.02 was obtained by phase separation, dried, and analyzed to be perchloroethylthiosulfenyl bromide.

|  | Found | Theoretical |
|---|---|---|
| Percent S | 18.4 | 18.5 |
| Percent Br | 23.2 | 23.2 |
| Percent Cl | 51.0 | 51.4 |

Polyhaloalkylthiosulfenyl halides of this invention find use as effective fungicides and chemical intermediates. The thiosulfenyl halides are of greater utility than the analogous sulfenyl halides because of their much lower volatility. This permits a longer residence time in which the thiosulfenyl halides maintain their protection.

The fungitoxic properties of compounds of this invention have been determined and these compounds have been found effective in the production of fungicidal compositions. As an illustration of the fungicidal properties, the following test results are presented:

A. Perchloromethylthiosulfenyl chloride was tested directly on live pinto beans which were subsequently to be inoculated with a fungus causing bean rust. In this test, three replicate plants growing in a standard University of California soil mix, in the three-triplicate state and approximately 5 inches tall, were sprayed at 15 p.s.i. with perhloromethylthiosulfenyl chloride in a dilution of 40 p.p.m. These suspensions were made uniform by means of an inert wetting agent and suitable filler. The plants were dried at ambient greenhouse temperatures and then inoculated with a spray of approximately 30,000 urediospores per ml. of *Uromyces phaseoli typica*. The plants were immediately incubated in a moist room for 24 hours at 72°–73° F. and a relative humidity of 95–97 percent after which they were removed to a room with ambient temperatures in the range of about 75°–78° F. and a relative humidity of 85–90 percent for about 12 days. At the end of this incubation period, disease readings were made by counting the local lesions on the primary leaves. These counts were compared with a similarly inoculated but unsprayed control series to determine the percentage of fungus control effected by the fungitoxic chemical. It was found that 98 percent control was obtained with perchloromethylthiosulfenyl chloride.

B. 1,1,2,2-tetrachloroethylthiosulfenyl chloride was dissolved in acetone in dilutions of 500 p.p.m. Paper discs previously inoculated by impregnation with equal amounts of *Helminthosporium sativum* broth culture were placed on potato dextrose agar medium and treated by applying a precise and equal volume of the fungicidal solution to their center. Following treatment with the fungitoxic chemical, the discs were incubated along with inoculated but untreated control discs at ambient temperatures until such time that these untreated control discs were filled with mycelial growth. The discs were placed on agar and the activity of the fungitoxic chemical tested was determined by comparative measurements of radii of mycelial growth on the agar away from the edge of the disc in treated and untreated samples. The ratio of these radii gives a percent infection which, when subtracted from 100 percent, gives the percent inhibition of fungus growth as an expression of the biological activity of the toxicant tested. 1,1,2,2-tetrachloroethylthiosulfenyl chloride gave 100 percent inhibition of Helminthosporium at this concentration.

C. Perchloroethylthiosulfenyl chloride was tested for a fungicidal activity by means of "The Standard Spore Slide Germination Method for Determining Fungicidal Activity," described in the American Phytopathological Society Journal, vol. 33, pages 627–632, 1943. This test is designed to measure the fungitoxic activity of fungicidal chemicals.

A sample of perchloroethylthiosulfonyl chloride was dissolved in acetone in a dilution of 10.0 p.p.m. This solution was then pipetted into the wells of a depression slide and allowed to dry. The wells were filled with a spore suspension of the test organism, *Monolinia fructicola* or *Alternaria solani*, and incubated in a moist chamber overnight. One hundred spores were used in each dosage. The number of spores not germinated were counted and recorded to show the percentage germination inhibition.

The results of these tests are as follows.

Test organism: Percent kill
  *Monolinia fructicola* _____ 100
  *Alternaria solani* _____ 99

Aside from the specific formulation and application of the class of compounds of the invention as represented by the foregoing tests, these compounds may be dispersed in or upon other inert liquid and solid carriers such as inert clay, xylenes, etc. The solid carriers may be in the form of a dust, or used in conjunction with a suitable wetting agent to form a wettable powder. The fungitoxic compounds of the invention may also be formulated with other solvents, dispersing agents, or emulsifying agents. Further, these compounds may not only be applied alone or in mixtures with other compounds of the disclosed class, but may also be used in combination with other active toxicants in the formulation of fungicidal compositions.

The compounds may be applied to any environmental area which is a host to fungus or susceptible to fungus attack. For example, the fungicidal compositions, because of their relatively low volatility, are especially useful as soil toxicants and, accordingly, may be sprayed or otherwise applied to the soil, applied directly to a plant or other host, to the plant seed, sprayed upon the plant environment, or used in other similar ways so as to effect the control of the fungus-caused diseases.

The thiosulfenyl halides of this invention also find important use as chemical intermediates. The perhalomethyl and perhaloethylthiosulfenyl halides may be used to form imido derivatives which are found to have a tranquilizing effect on laboratory animals.

As will be evident to those skilled in the art, various modifications on this process can be made or followed, in the light of the foregoing disclosure and discussion, without departing from the spirit or scope of the disclosure or from the scope of the following claims.

We claim:
1. Compounds of the formula:

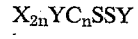

wherein X is selected from the group consisting of hydrogen and halogen, at least 2 X's being halogen said halogen being of atomic number 17 to 35, Y is halogen of atomic number 17 to 35 and when bonded to carbon is alpha to the sulfur, and $n$ is a cardinal number of from 1 to 2.

2. Compounds of the formula:

wherein X and Y are halogen of atomic number 17 to 35.

3. Compounds of the formula:

wherein X and Y are halogen of atomic number 17 to 35.

4. Perchloromethylthiosulfenyl chloride.
5. Perchloroethylthiosulfenyl chloride.
6. 1,1,2,2-tetrachloroethylthiosulfenyl chloride.
7. Method of preparing polyhalo(lower alkyl)thiosulfenyl halides, wherein said polyhalo(lower alkyl) group has at least 3 halogens, which comprises contacting the desired polyhalo(lower alkyl)sulfenyl halide, with from 0.5 to 5.0 moles of sulfur per mole of said sulfenyl halide in the presence of a trihydrocarbyl phosphate ester, wherein the hydrocarbyl groups are from 1 to 10 carbons, and present in an amount of from 0.01 to 10% by weight of the reaction mixture, at a temperature in the range of about 50 to 200° C. and obtaining the analogous polyhalo(lower alkyl)thiosulfenyl halide.

8. A method according to claim 7 wherein the step is added of bubbling chlorine into the reaction mixture at a temperature in the range of about −10 to 25° C. and in an amount of from about 0.25 to 2 moles of chlorine per mole of sulfenyl halide.

9. Method of preparing polyhalo(lower alkyl)thiosulfenyl halides, wherein said polyhalo(lower alkyl) group has from 3 to 9 halogens of atomic number 17 to 35, which comprises contacting the desired polyhalo(lower alkyl)sulfenyl halide with from 1 to 2 moles of sulfur per mole of said sulfenyl halide in the presence of a trihydrocarbyl phosphate ester, wherein the hydrocarbyl group is of from 1 to 10 carbons, and is present in an amount of from about 1 to 3 weight percent of the reaction mixture, at a temperature in the range of about 130 to 160° C. and obtaining the analogous polyhalo(lower alkyl)thiosulfenyl halide.

10. A method according to claim 9, wherein the step is added of introducing chlorine at a temperature in the range of about −10 to 25° C. in an amount of from about 0.25 to 2 moles of chlorine per mole of sulfenyl halide.

11. A method according to claim 10, wherein the temperature is of from about 0 to 10° C. and the chlorine is in an amount of from about 0.5 to 1 mole per mole of sulfenyl halide.

12. Method of preparing compounds of the formula:

wherein X is selected from the group consisting of hydrogen and halogen, at least 2 X's being halogen, Y is halogen of atomic number 17 to 35 and when bonded to carbon is alpha to the sulfur, and $n$ is a cardinal number of from 1 to 2, which comprises contacting the desired sulfenyl halide with sulfur in an amount of from 0.5 to 5 moles per mole of sulfenyl halide at a temperature in the range of about 130 to 160° C. in the presence of a trihydrocarbyl phosphate ester wherein the hydrocarbyl group is of from 1 to 10 carbons, and is present in an amount of about 0.01 to 10% by weight of the reaction mixture, at a temperature in the range of about 130 to 160° C., followed by the addition of chlorine at a temperature in the range of about −10 to 25° C. and in an amount of from about 0.25 to 2 moles of chlorine per mole of sulfenyl halide, and isolating the desired thiosulfenyl chloride.

References Cited by the Examiner

FOREIGN PATENTS 1,125,915   3/1962   Germany.

OTHER REFERENCES

Fuson et al.: J. Org. Chem., vol. 11, 1946, pp. 470, 499, 501.

LORRAINE A. WEINBERGER, *Primary Examiner.*

LEON ZITVER, *Examiner.*